Dec. 2, 1952 S. OVSHINSKY 2,619,709
MACHINE TOOL
Filed May 26, 1947 5 Sheets-Sheet 1
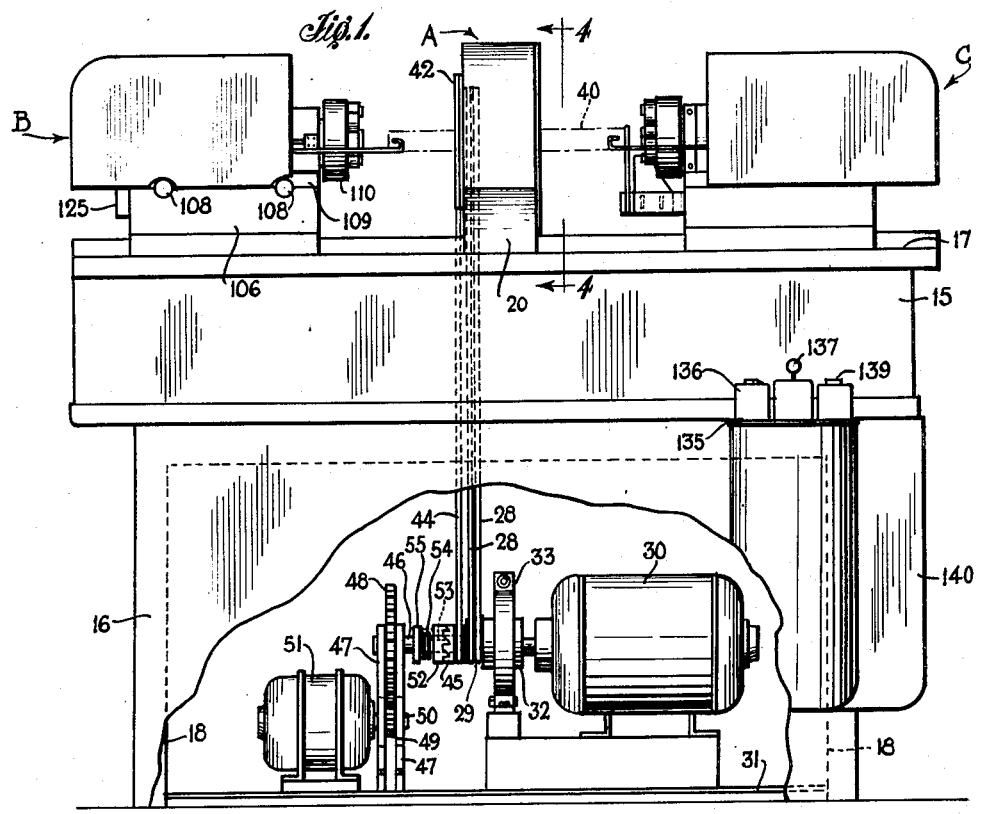
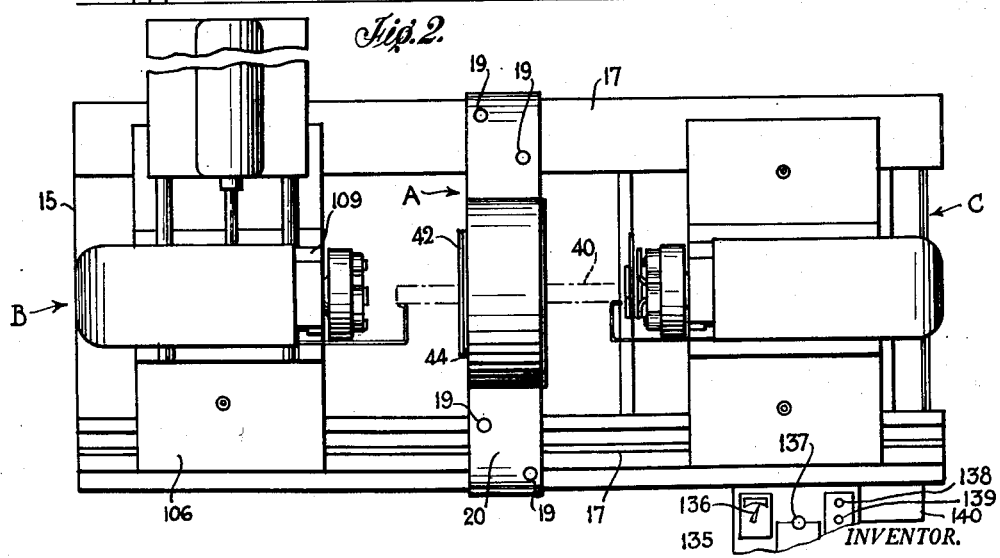
INVENTOR.
STANFORD OVSHINSKY
BY Ely & Frye
ATTORNEYS Dec. 2, 1952 — S. OVSHINSKY — 2,619,709
MACHINE TOOL
Filed May 26, 1947 — 5 Sheets-Sheet 2
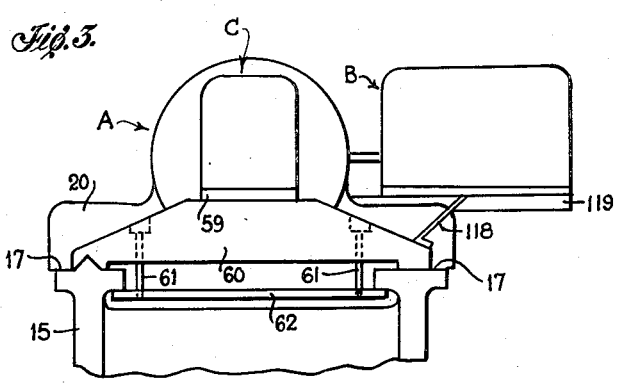
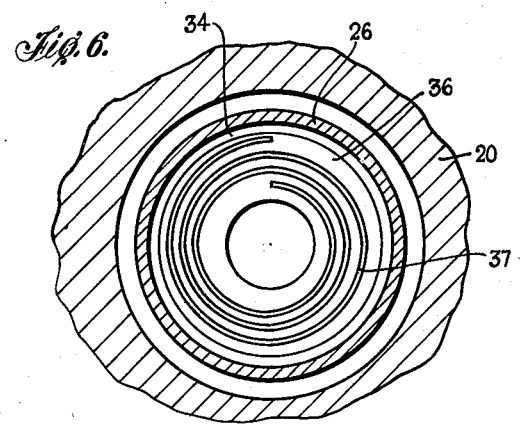
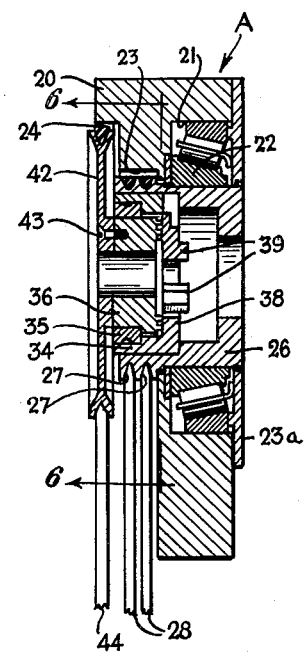
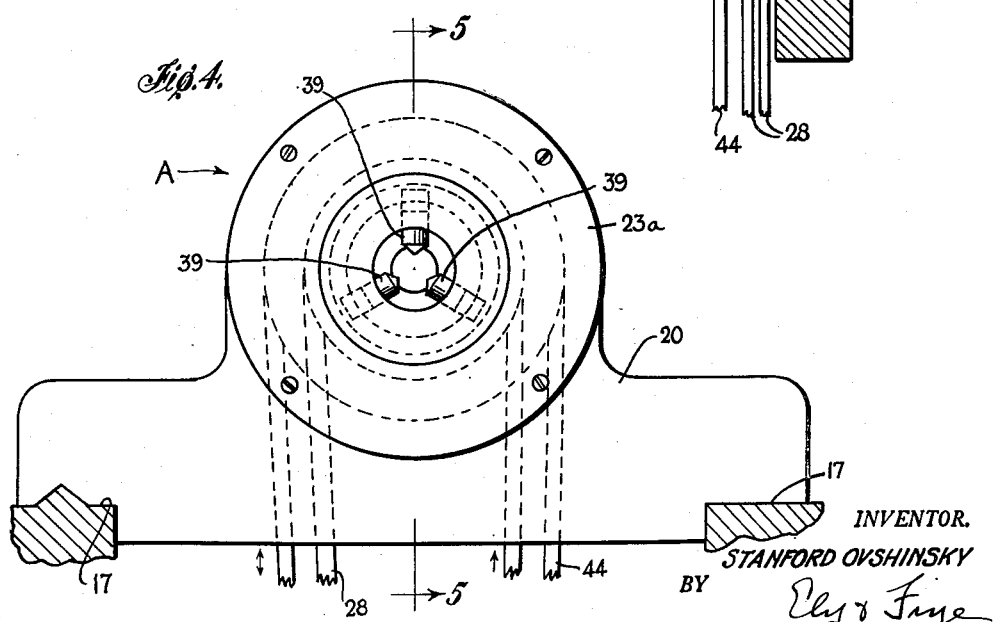
INVENTOR.
STANFORD OVSHINSKY
BY Ely & Frye
ATTORNEYS Dec. 2, 1952     S. OVSHINSKY     2,619,709
MACHINE TOOL
Filed May 26, 1947     5 Sheets-Sheet 3
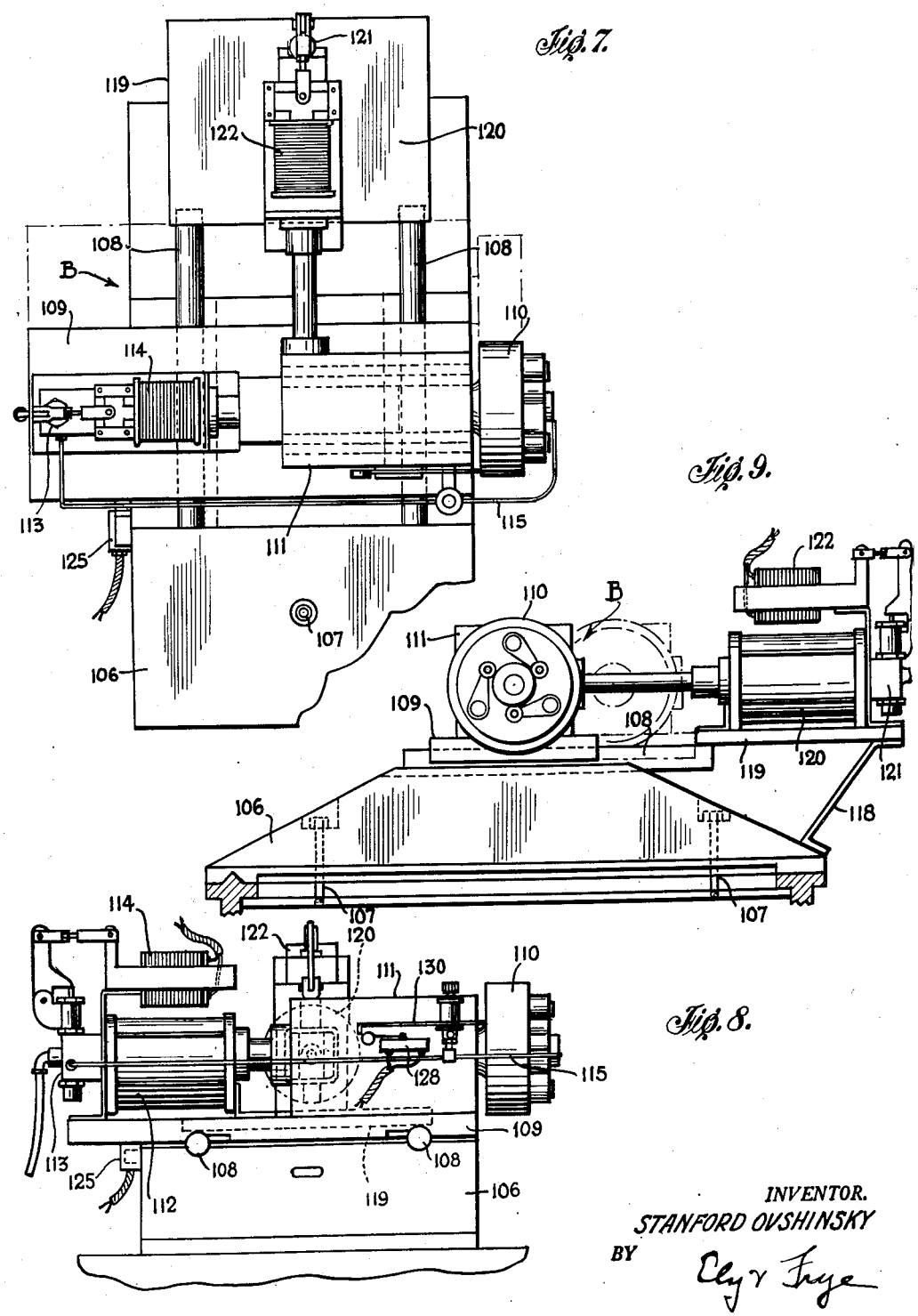
INVENTOR.
STANFORD OVSHINSKY
BY
ATTORNEYS

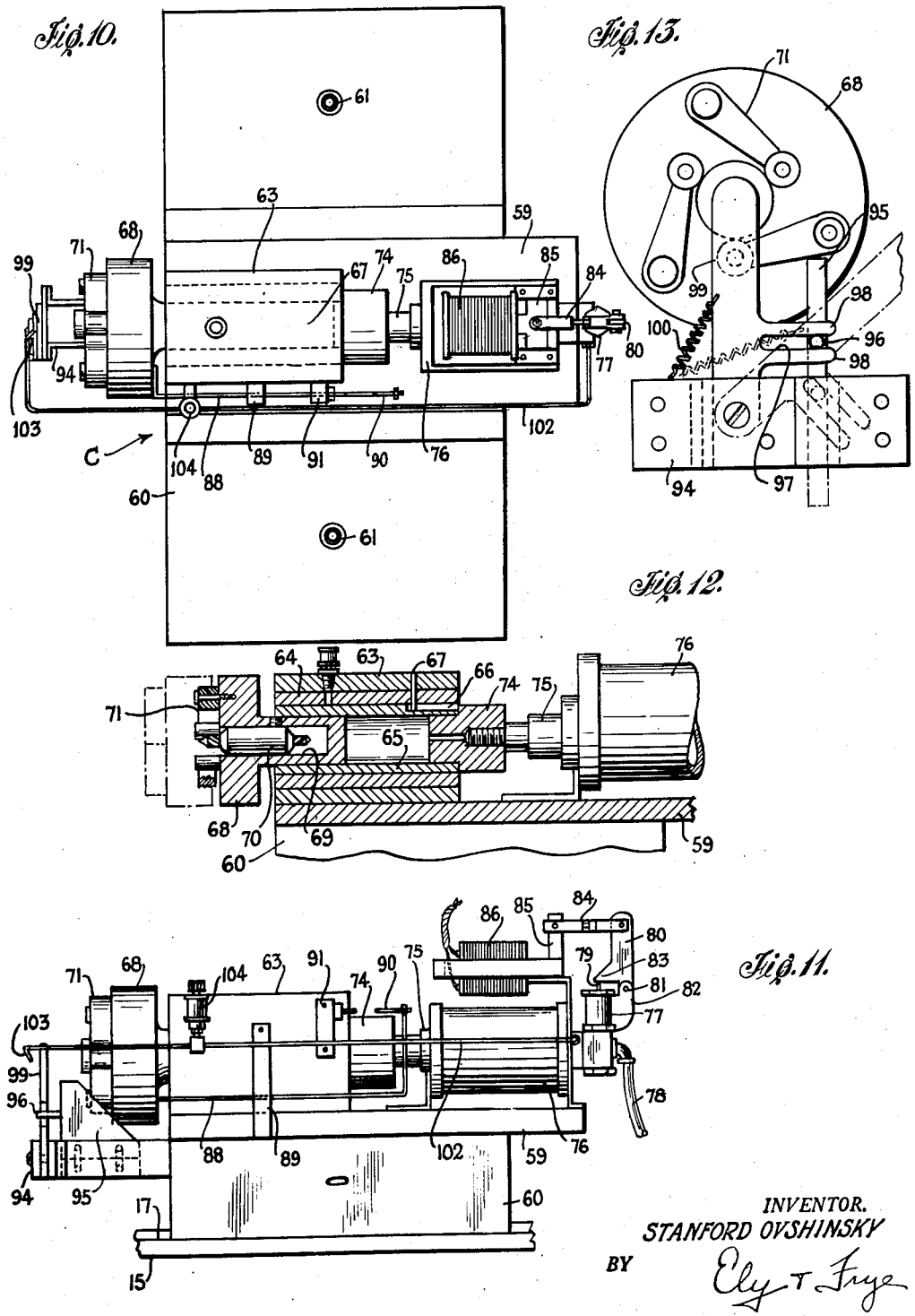

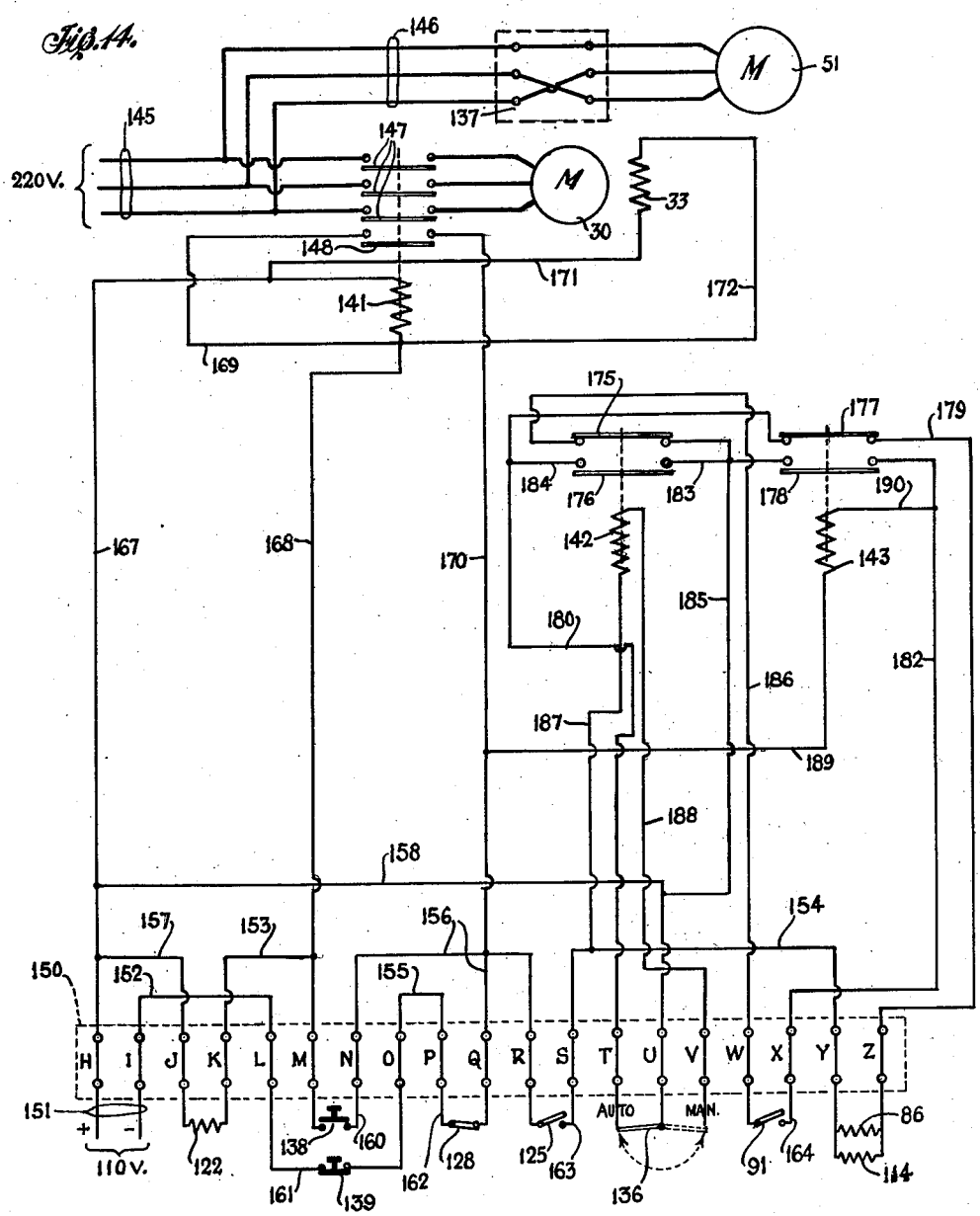

Patented Dec. 2, 1952

2,619,709

UNITED STATES PATENT OFFICE 2,619,709

MACHINE TOOL

Stanford Ovshinsky, Akron, Ohio, assignor to The Stanford Roberts Manufacturing Company, Akron, Ohio, a corporation of Ohio Application May 26, 1947, Serial No. 750,391

4 Claims. (Cl. 29—27)

This invention relates to machine tools, and more especially it relates to improved machine tools adapted concurrently to perform machining operations upon opposite ends of a work-piece.

More particularly, the machine is of the type wherein the work is supported and rotated by a centrally disposed, mechanically operated chuck, and wherein the conventional head-stock and tail-stock of conventional machine tools are replaced by tool holders arranged for movement axially of the work-piece.

The chief objects of the invention are to provide an improved machine tool of the character mentioned; to increase production and reduce costs by concurrently machining both ends of the work; to effect absolute accuracy of the machining operations; to provide simplicity of construction whereby maintenance and repair are negligible factors; to provide a construction that enables the work to be mounted readily and in a facile manner; to provide an improved chucking device that operates mechanically and without manual control; to provide automatic operation of various elements of the machine; to provide in an improved manner for cleaning and lubricating the tools of the machine; and to provide a machine tool adapted to perform a number of different machine operations upon the work. Other objects will be manifest as the description proceeds.

Of the accompanying drawings:

Fig. 1 is a front elevation of a machine tool embodying the invention, including protective guards over some of the movable elements thereof;

Fig. 2 is a plan view thereof;

Fig. 3 is an end elevation as viewed from the right of Figs. 1 and 2, a part thereof being broken away;

Fig. 4 is an elevation, on a larger scale, of the chuck element of the machine as seen from line 4—4 of Fig. 1;

Fig. 5 is a section on the line 5—5 of Fig. 4;

Fig. 6 is a section on line 6—6 of Fig. 5;

Fig. 7 is a plan view, on a larger scale, of the tool-holding structure located at the left end of the machine as viewed in Fig. 1, the protective guards being removed;

Fig. 8 is a side elevation of the structure shown in Fig. 7;

Fig. 9 is an elevation of the structure shown in Figs. 7 and 8 as viewed from the right thereof;

Fig. 10 is a plan view of the tool-holding structure at the right end of the machine as viewed in Fig. 1, the protective guards being removed;

Fig. 11 is a side elevation of the structure shown in Fig. 10;

Fig. 12 is a sectional detail of a portion of the structure shown in Figs. 10 and 11;

Fig. 13 is an end elevation of the structure shown in Figs. 10 and 11, as viewed from the left thereof, on a larger scale, showing the operation of the work-positioning mechanism, and Fig. 14 is a wiring diagram of the machine.

Referring now to Figs. 1 and 2 of the drawings wherein the tool is shown in its entirety, it will be seen that the essential elements thereof are an elongated bed 15 upon the top of which is mounted a chuck A located intermediate the ends thereof, a tool-holding structure B located at one end of said bed (the left end as viewed in the drawing), and a tool-holding structure C located at the opposite end of said bed. The bed 15 is supported at an elevation above the floor upon any suitable framework or legs 18 that are concealed by an apron or enclosure 16, Fig. 1, located below said bed. The top of the bed 15 is formed with respective ways 17 that extend longitudinally of the bed on opposite sides thereof.

The chuck A comprises a heavy casting or head 20 that spans the bed 15 and rests upon the ways 17 at opposite sides thereof, said head being maintained fixedly in position by set screws 19 that extend therethrough and engage said ways. The head 20 is centrally apertured, which aperture, on one side of the head (the right side as viewed in Fig. 5), is formed with a circumscribing recess or counterbore 21 that is concentric therewith. Mounted in counterbore 21 is a bearing, herein shown as a roller bearing 22, which bearing is retained in place by a retainer or face plate 23a secured to the side of the head 20. On the opposite side of the head 20 from the counterbore 22 said head is laterally recessed at 23 and 24, both of which recesses have arcuate portions concentric with the central aperture of the head located above their common axis. Below the latter said recesses extend downwardly to the bottom face of the head. The arcuate portion of recess 23 is of slightly larger radius than the central aperture of the head, and the arcuate portion of recess 24 has substantially larger radius than recess 23.

Journaled in bearing 22 is a chuck housing 26 that is a generally tubular structure, one end face of which is flush with the face plate 23a. The opposite end portion of housing 26 is disposed within recess 23 in the head, and is formed exteriorly with a pair of pulley-grooves 27, 27, that receive respective side-driving transmission belts 28. The latter extend downwardly through the recess 23 and are trained about a double-grooved pulley 29 that is mounted upon the shaft of an electric motor 30, Fig. 1, which motor is mounted upon a shelf 31 carried by the legs 18 in the lower region of the machine. The arrangement is such that the chuck-housing 26 may be rotated relatively of the head 20, in counterclockwise direction as viewed in Fig. 4. Beside pulley 29 the shaft of motor 30 carries a brake drum 32, the latter being operatively associated with a solenoid-operated electric brake 33. The latter is of the conventional type employing a spring to apply braking pressure and a solenoid in opposition to said spring to release braking pressure.

That end portion of the chuck-housing 26 that is formed with the pulley-grooves 27 is interiorly recessed or counterbored to receive an annular chuck 34 that is fixedly mounted therein, and said chuck is axially recessed from one end thereof to receive a bearing 35, in which bearing an annular cam-plate or scroll-plate 36 is journaled. As is best shown in Fig. 6, the scroll-plate 36 has its front lateral face formed with a raised rib 37 arranged in volute or spiral form around the axial aperture of the plate. The spiral rib 37 confronts a radially inwardly extending end-flange 38 on the chuck 34, and said flange is formed with a plurality of undercut radial slots, herein shown as three in number, in which slots respective chuck-jaws 39 are mounted. The rear faces of the latter are formed with arcuate, transverse grooves and intervening ribs that are complemental to the spiral rib 37 and groove defined thereby, and which interfit with said spiral rib and groove. The arrangement is such that when the scroll-plate 36 and chuck 34 rotate relatively of each other, the spiral rib 37 operates as a cam to effect radial movement of the jaws 39. Thus, the inner ends of the jaws may be moved inward concurrently to grip a work-piece, such as that shown in broken lines at 40, Figs. 1 and 2, or moved outwardly to release the same, said work-piece extending axially through the head 20 and annular elements mounted therein. Since the chuck 34 is fixedly mounted in the chuck-housing 26, it will be driven in either direction by the electric motor 30 hereinbefore described.

The scroll-plate 36 also is arranged to be power-driven independently of the chuck 34 and to this end a grooved pulley 42, of substantially larger diameter than the pulley-grooves 27, is mounted in driving relation to said scroll-plate on the end face thereof remote from the spiral rib 37. The pulley 42 has an axially apertured hub portion, and said hub is secured to the scroll-plate, coaxially thereof, by any suitable means such as screws 43. A side-driving transmission belt 44 is trained about the pulley 42, and extends downwardly therefrom through recess 24 in the head 20, to the lower part of the machine where it is trained about a grooved pulley 45. The latter is journaled upon the end portion of a countershaft 46 journaled in a pair of spaced-apart bearing brackets 47, 47, that rise from the shelf 31, there being a relatively large gear 48 mounted upon said countershaft between said bearing brackets 47. Meshed with gear 48 is a relatively small pinion 49 mounted upon the driving shaft 50 of a reversible electric motor 51, the latter being mounted upon shelf 31. One end face of the pulley 45 is formed with radial serrations that constitute one element of a driving clutch, the mating element of which is a complementally serrated member 52 that is slidably mounted upon a countershaft 46 in confronting relation to pulley 45, and has driving connection with said countershaft through the agency of a feather key 53. The clutch member 52 is yieldingly urged axially toward the pulley 45 by a compression spring 54 that is mounted upon the countershaft between a lateral face of member 52 and a collar 55 secured upon said countershaft. The teeth of the serrated clutch elements are so arranged that the scroll-plate 36 is positively driven by motor 51 in counterclockwise direction as viewed in Figs. 4 and 6, and frictionally driven in clockwise direction.

In the operation of the chuck structure A, the brake 33 initially is de-energized and applies braking pressure to brake drum 32 whereby chuck 34 is firmly held stationary. After a work-piece 40 is placed in the chuck, the reversible motor 51 is energized so as to drive the scroll-plate 36 in clockwise direction as viewed in Figs. 4 and 6, with the result that the chuck jaws 39 are moved radially inwardly and grip the work-piece 40. During said movement of the scroll-plate there is sufficient friction between clutch members 45, 52, induced by the spring 54, to hold said clutch members in mesh. As soon as the jaws 39 engage the work-piece, rotary movement of the scroll-plate 36 relatively of chuck 34 is arrested, and clutch member 52 ratchets over clutch member 45 against the pressure of spring 54, and produces an audible sound that apprises the operator that the workpiece is engaged by the chuck. The operator then arrests the operation of motor 51. Subsequently, the motor 30 drives the chuck 34 in counterclockwise direction as viewed in Figs. 4 and 6, with the result that the chuck-jaws 39 continue to be urged inwardly against the work-piece 40, and the latter is rotated so that work may be performed thereon. The counterclockwise movement of the chuck 34 is translated to the scroll-plate 36 through the agency of the chuck-jaws 36, thus reversing the movement of the latter, the belt 44 and the clutch member 45, with the result that the latter ratchets past the teeth of clutch member 52 as the latter moves axially rearwardly against spring 54. The condition described obtains as long as operations are being performed upon the work-piece. Thereafter the operation of motor 30 automatically is arrested and brake 33 is de-energized so that it applies braking pressure to brake drum 32. The operator then reverses motor 51 with the result that there is positive drive through the clutch members 52, 45, to the belt 44, the latter driving the scroll-plate 36 in counterclockwise direction. Since the chuck 34 is held stationary by reason of the brake 33, such relative movement of the scroll-plate moves the chuck-jaws 39 radially outwardly and releases the work-piece 40, which then may be removed from the chuck. The operator stops the drive of motor 51 as soon as the jaws 39 release the work-piece.

The tool-holding structure C at the right-hand end of the machine is shown in detail in Figs. 10 to 13, inclusive, of the drawings, to which attention now is directed. Said tool-holding structure comprises a slide 60 that is mounted upon the ways 17 and is adjustably secured at selective positions longitudinally of the bed 15 by set screws 61, 61, that extend through the slide at opposite sides thereof and are threaded into a metal strip 62, Fig. 3, that engages the bed 15 beneath overhanging portions of the respective ways 17. Fixedly mounted atop the slide 60 on a base plate 59, at the end thereof nearest the chuck A, and on the longitudinal centerline of the machine, is an elongate block 63 in which a bushing 64, Fig. 12, is fixedly mounted. A metal sleeve 65 is mounted for axial movement in the bushing 64, said sleeve being formed exteriorly with a longitudinally extending slot 66 in which a pin or stud 67 is received, the latter extending through the wall of the block 63 and bushing 64 and serving to prevent rotary movement of the sleeve 65 relatively of said bushing. The end of the sleeve 65 that confronts the chuck A has a tool holder 68 mounted therein, which tool holder is secured against movement relatively of the sleeve by having a force fit therein, or by any other suitable means. The tool holder is formed with an axial bore 69 in which a tool 70 is receivable, said tool being secured against movement relatively of its holder in any suitable manner. The front face of the tool holder is provided with conventional work-centering arms 71.

The sleeve 65 is movable axially to present the tool 70 to the work-piece 40 and to retract it therefrom, and to this end said sleeve has a plug or fixture 74 force fitted or otherwise securely mounted in the end portion thereof remote from the tool holder 68. The fixture 74 has a threaded axial recess by which it has threaded connection with outer end of the piston rod 75 of a double-acting fluid pressure operated reciprocating motor including the cylinder 76. The latter is positioned on the longitudinal centerline of the machine and is mounted upon the base plate 59. Operation of the reciprocating motor including the cylinder 76 is controlled by a suitable valve 77 that admits pressure fluid alternately to opposite ends of the cylinder and vents it therefrom. In Fig. 11 is shown a pipe or conduit 78 that conducts pressure fluid, such as air under pressure, to the valve 77 from a suitable source of pressure fluid (not shown). The valve 77 comprises a spring-backed operating plunger or pin 79 adapted to be depressed to admit air to the rear end of cylinder 76. For depressing said pin, an upstanding lever 80 is provided, which lever is pivotally mounted at 81 at its lower end upon a bracket 82 supported by the casing of valve 77, and formed with a laterally projecting toe 83 that engages valve-pin 79. The free, upper end of lever 80 is connected by an adjustable link 84 to a upwardly extending formation on the movable core 85 of an electrical solenoid 86 that is mounted above the cylinder 76. The arrangement is such that when the solenoid is energized, the core 85 thereof is moved toward the left as viewed in Figs. 10 and 11, whereby the lever 80 is swung on its pivot 81 so that its toe 83 depresses valve-pin 79 and thus operates valve 77 to charge the rear end of cylinder 76 while discharging the front end thereof. The operations mentioned are reversed when the solenoid is de-energized.

A cycle of operation of the reciprocating motor including the cylinder 76 as described moves the tool holder 68 a determinate distance outwardly, as indicated by the broken lines in Fig. 12, and then retracts it to point of starting. When in projected position the tool 70 in holder 68 performs its intended operation upon the work 40. The extent of outward movement of the tool holder 68 is controlled by the reversing of the reciprocating motor including the cylinder 76 which in turn is controlled by the solenoid 86, and means is provided for automatically deenergizing said solenoid when the tool holder 68 reaches a determinate outer or projected position. To this end a rod 88 is fixedly secured at one end to the rear face of the tool holder 68, said rod extending rearwardly beside the block 63 and through a guide member 89, said rod having an upwardly extending rear end portion, the extremity of which has an operating stud 90 adjustably mounted therein. The stud 90 is arranged parallel to the axis of the machine so as to move longitudinally with the holder 68, and is in alignment with the operating button of an electrical switch 91 that is mounted on the side of block 63. The switch 91, which is normally open, is closed by action of the stud 90 when the holder 68 is projected outwardly to the extent desired. Closing of said switch 91 is arranged to effect, among other things, de-energization of the solenoid 86 as will be manifest from the wiring diagram shown in Fig. 14, subsequently to be described.

The work-piece 40 is mounted in the chuck structure A by being moved longitudinally through the axial opening in the latter, and means operatively associated with the tool-holding structure C is provided for obstructing further longitudinal movement of the work-piece after it has reached a determinate operative position. To this end a bracket 94 is mounted upon the end face of slide 60 that is directly below tool holder 68. Slidably mounted in said bracket is a vertically positioned plate 95 that is movable in its own plane, said plate having one oblique margin that engages the front peripheral corner of the tool-holder 68. The arrangement is such that when the tool-holder is projected to its outer position shown in broken lines in Fig. 12, it forces the plate 95 downwardly in its own plane. The front margin of the plate 95 has a stud 96 projecting horizontally therefrom, which stud is slidably received within an elongated recess or slot 97 defined by a pair of parallel ears 98, 98, formed integral with and projecting laterally from one edge of a stop-finger 99, in the plane of said finger. The stop-finger is pivotally mounted at its lower end on the bracket 94. When the tool-holder 68 is in the retracted position shown in Figs. 10 and 11, the stop finger 99 is in vertical position, its upper end portion being disposed in front of the tool-holder 68 in position to obstruct the movement of a work-piece 40 that is being moved longitudinally toward said tool-holder, and thereby accurately to position said work-piece. Thereafter when the tool holder is projected toward the work-piece to operate thereupon, axial movement of the tool holder forces the plate 95 downwardly and the stud 96 thereof swings the stop-finger 99 angularly about its pivot, from the position shown in full lines in Fig. 13 to the position shown in broken lines therein, thus enabling the tool 70 to engage the end of the work-piece. Such swinging movement of the stop-finger 99 is against the tension of a coiled spring 100 that is connected at one of its ends to the stop-finger and connected at its other end to the bracket 94, said spring serving to restore the stop-finger to its full line, work-obstructing position upon subsequent retraction of the tool-holder.

Another advantageous feature of the machine is the provision of means that automatically lubricates the operative end of tool 70 and blows the chips therefrom. To this end a small pipe or conduit 102 is connected at one of its ends to the exhaust port of the valve 77, said pipe extending forwardly therefrom and having its front end disposed slightly forwardly of the position of the tool holder 68 when the latter is projected. The front end portion of the pipe is angularly bent, as best shown at 103, Figs. 10 and 11, so as to be directed toward the operative end of the tool in the projected tool-holder. Intermediate its ends the pipe 102 is in communication with a lubricant cup 104 that is mounted upon the side of block 63 and adapted to feed lubricant, a drop at a time, into the pipe. The arrangement is such that when the valve 77 operates to exhaust air from the rear end of cylinder 76, to effect retraction of work-holder 78, some of the exhausting air passes through pipe 102 and blows a spray of lubricant from its front end, which spray lubricates the tool 70 as it is withdrawn from the work, and also dislodges any metal chips that may be clinging thereto.

The tool-holding structure B at the left-hand end of the machine is shown in detail in Figs. 7 to 9, inclusive, of the drawings. The tool-holding structure B has many features and elements that are identical with features and elements present in structure C and for that reason need not be described in as much detail. As shown, the tool-holding structure B comprises a slide 106 that rests upon the ways 17 of the bed 15 of the machine, being secured in selected position by the set-screws 107. Mounted upon the top of said slide is a pair of slideways consisting of a pair of parallel cylindrical rods 108, 108, said slideways being disposed transversely with relation to the ways 17. As shown in Fig. 9, the medial region of the top of slide 106 is horizontal, with downwardly sloping regions at front and rear thereof, the slideways 108 being received in respective shallow grooves in the medial region of the slide-top and extending rearwardly therefrom so as to overhang a portion of the sloping surface at the rear thereof. Mounted upon the slideways 108 for movement longitudinally thereof is a carriage 109. Mounted upon the top of the latter is a tool-holding structure, the essential elements of which, namely, the tool-holder 110, the block 111 and elements within the same, the fluid pressure operated reciprocating motor including the cylinder 112, the valve 113, and the solenoid 114, are identical with the similar elements of the tool-holding structure C at the opposite end of the machine, as is the pipe 115 for lubricating the tool (not shown) in the tool-holder 110.

Energizing of the solenoid 114 operates valve 113 to charge the rear end of cylinder 112 while discharging the front end thereof, thus projecting the tool-holder 110 to the right as viewed in Figs. 1, 2, 7 and 8, so that the tool therein operatively engages the adjacent end of work-piece 40. Said tool (not shown) is opposite hand from the tool 70 that engages the opposite end of the workpiece. The solenoids 86, 114, are electrically connected so as to operate concurrently, as subsequently will be explained with relation to the wiring diagram of the machine.

Supported upon the rear end portions of the slideways 108 and brackets 118 rising from the sloping rear top-surface of the slide 106 is a plate 119, and mounted upon the latter is the mechanism for effecting movement of carriage 109 longitudinally of said slideways. Said mechanism comprises a double-acting fluid pressure operated reciprocating motor including the cylinder 120, the piston rod 121 of which is connected at its outer end to the block 111 mounted upon the carriage 109. Like the other fluid pressure cylinders of the machine, the admission of fluid to and from the cylinder 120 is controlled by a valve 121, the latter being operated by an electrical solenoid 122. The arrangement is such that when the rear end of cylinder 120 is charged, the carriage 109 is in the position shown in full lines in Figs. 2, 7 and 9, with the result that the tool-holder 110 is positioned upon the longitudinal center line of the machine, in axial alignment with the work-piece 40 and tool-holder 68, so that work is performed upon the work-piece when said tool-holders are projected toward each other. When the front end of cylinder 120 is charged and the rear end exhausted, the carriage 109 is moved rearwardly to its position shown in broken lines in Figs. 7 and 9, with the result that the tool-holder 110 and block 111 are moved entirely to one side of the longitudinal center line of the machine. The arrangement makes it possible easily and quickly to remove a finished work-piece from the chuck structure A and replace it with unfinished work.

Mounted upon the side of slide 106 is a normally open electrical switch 125, which switch is so positioned that it is engaged by the carriage and closed when said carriage is in the full line position shown in Figs. 7 and 9, which is the operative position of the carriage. The switch 125 controls the operation of solenoids 86, 114, serving to effect energization thereof, as presently will be manifest, and thus to cause cylinders 76, 112, to project the respective tool-holders 68, 110. Mounted upon the side of block 111 is a normally closed electrical switch 128, the operating lever of which is disposed in the path of an operating finger 129 that is carried by an arm 130, the latter being attached to the tool-holder 110 and projecting rearwardly therefrom. The arm 130 moves longitudinally with the tool-holder 110 as the latter is projected and retracted, and thus moves the finger 129 back and forth over the operating lever of switch 128. Said finger 129 is so pivotally mounted on arm 130 that it pivots freely when moved over the switch 128 as the holder 110 is projected, and the normal condition of the switch is not affected. However, when the tool-holder 110 is retracted from its projected position, the finger 129 does not turn on its pivot when it encounters the operating lever of switch 128, with the result that it depresses said operating lever and momentarily opens said switch. The switch 128 is so electrically connected as to effect de-energization of solenoid 122, and to arrest the drive of motor 30, as presently will be explained.

Other electrical switches in the electrical circuit of the machine are mounted upon a shelf 135 at the front of the machine, as shown in Figs. 1 and 2, and are manually operable. One of said switches, designated 136, is a single-pole double-throw switch by which the machine is adapted alternatively for automatic or for manual operation. In Fig. 14 this switch is shown as set for automatic operation; it is set for manual operation, as shown in broken lines, only while the machine is being set up for operation. Also mounted upon shelf 135 is a reversing switch 137 that controls the operation of the reversible motor 51, said switch being manually operable, and returning to the neutral or open position when the operator releases the same. A third switch mounted upon the shelf 135 is a start-stop switch of which 138 is the normally open starting button and 139 is the normally closed stop button. Mounted upon the apron 16 of the machine is a control box 140 within which are mounted three relays, namely, 141, 142, and 143, which relays are shown in Fig. 14. Said relays control the operation of switches presently to be described, and may be of the solenoid type.

For an understanding of the wiring diagram of the machine, attention is directed to Fig. 14. As shown therein, the motor 30 is in a main 220 volt, 3 phase circuit 145, reversible motor 51 being connected in parallel in the same main circuit by conductors 146, the switch 137 being interposed across the latter for controlling motor 51. Control of the motor 30 is effected by a normally open 4-pole switch that is operated by the solenoid relay 141, three poles of said switch being designated 147 and being operatively connected to the respective conductors of the circuit 145. The other pole 148 of said switch is in the holding circuit of relay 141 as presently will be explained.

The control means for the electrical mechanisms comprises a terminal strip 150 that carries 19 terminals designated H to Z, both inclusive. The control circuit operates on 110 volts, the leads thereof being designated 151 and connected to terminals H and I respectively. Terminals I and L are connected or "jumpered" by conductor 152. Terminals K and M are jumpered by conductor 153. Terminals S and Y are jumpered by conductor 154. Terminals O and P are jumpered by conductor 155. Terminals N, Q, and R are jumpered by conductor 156. Terminals H and J are jumpered by conductor 157, and terminals H and U are connected by jumper 158. Solenoid 122 is connected across terminals J and K, and solenoids 86, 114, are connected across terminals Y and Z. Switch 138 is interposed in a conductor 160 connecting terminals M and N, and switch 139 is interposed in conductor 161 connecting terminals L and O. Switch 128 is in conductor 162 connecting terminals P and Q, and switch 125 is in conductor 163 connecting terminals R and S. Switch 136 is arranged alternatively to connect terminal U with terminal T for automatic operation, or with terminal V for manual operation. Switch 91 is interposed in conductor 164 that connects terminals W and X.

Solenoid coil 141 is connected to terminal H (or to jumpers 157 or 158) by conductor 167, and to terminal M (or jumper 153) by conductor 169. A holding circuit for solenoid 141 is provided by conductor 169 connected to conductor 168 and to one side of switch 148, and by conductor 170 connected to the other side of switch 148 and to terminal Q (or jumper 156). The solenoid operated brake 33 of motor 30 is connected to the control circuit by a conductor 171 extending to conductor 167, and a conductor 172 extending to conductor 168. The arrangement is such that brake 33 is energized to release braking of motor 30 whenever solenoid 141 is energized to close switch 147 and thereby to effect driving of motor 30.

The relay 142 aforementioned controls the operation of a normally closed switch 175 and a normally open switch 176; the relay 143 controls the operation of a normally closed switch 177 and a normally open switch 178. One pole of switch 177 is connected to terminal Z by conductor 179, the other pole of said switch being connected to terminal T by conductor 180. One pole of switch 178 is connected to terminal X by conductor 182, the other pole thereof being connected to one pole of switch 176 by conductor 183. The other pole of switch 176 is connected to conductor 180 by conductor 184. One pole of switch 175 is connected to terminal U (through jumper 158) by conductor 185, the latter also connecting with conductor 183. The other pole of switch 175 is connected to terminal W by conductor 186. The relay 142 is connected to jumper 154 by conductor 187, and is connected to terminal V by conductor 188. Relay 143 is connected to conductor 170 by conductor 189 and to conductor 182 by conductor 190.

*Operation*

When in inoperative position, the tool holders 68, 110, are in retracted position, the latter being positioned laterally of the center line of the machine as shown in broken lines in Figs. 7 and 9. The electric brake 33 is de-energized and is exerting braking pressure upon brake drum 32 of motor 30. The operator may then readily mount the work-piece 40 in the chuck structure A, moving it longitudinally therethrough until its leading end abuts the stop finger 99. Assuming that switch 136 is set for automatic operation, as shown in full lines in Fig. 14, the operator closes switch 137 to start the drive of reversible motor 51 which effects the closing of chuck 34 upon the work-piece 40 as previously explained. As soon as the work-piece is firmly gripped by the chuck, the operator releases switch 137 and momentarily depresses (closes) starting switch 138 with the result that relay 141 is energized and closes switches 147, 148, and brake 33 is energized to release the braking of motor 30. Closing of switch 147 closes circuit 145 to motor 30, and the latter begins rotating to drive the work-piece 40. Closing of switch 148 completes the holding circuit for relay 141 so that when the operator releases and opens switch 138 said relay will continue to be energized through conductor 167, conductor 169, switch 148, conductor 170, jumper 162 and closed switch 128 therein, jumper 155, jumper 161, and closed switch 139 therein, and jumper 152. The holding circuit for relay 141 also constitutes a holding circuit for solenoid 122, as will be apparent from Fig. 14. Closing of starting switch 138 as described also energizes solenoid 122; and this solenoid remains energized, after switch 138 subsequently is opened, by virture of the holding circuit for relay 141, as will be readily understood by those skilled in the art. When solenoid 122 is energized, it operates air cylinder 120 to cause the latter to project its piston rod and move carriage 109 to the full line position shown in Figs. 7 and 9, thereby positioning tool holder 110 in axial alignment with work-piece 40 and tool holder 68. When carriage 109 reaches its ultimate projected position, it engages and closes normally open switch 125, with the result that solenoids 86, 114, concurrently are energized to effect charging of the rear ends of cylinders 76, 112, and thus to move the tool holders 68, 110, axially toward the opposite ends of work-piece 40. Axial movement of tool holder 68 moves the stop-finger 99 away from in front of the work-piece and thereby enables the tool 70 to operate thereon, as previously described. The tools in the respective tool holders operate concurrently upon the work-piece.

As the tool holders reach the desired projected positions where the operation upon the work-piece is completed, stud 90 moving with tool-holder 68 engages normally open switch 91 and closes the same. Closing of switch 91 energizes relay 143 and thus effects the closing of relay switch 178 and the concurrent opening of relay switch 177. Opening of switch 177 breaks the circuit of the solenoids 86 and 114, thereby effecting the exhausting of the rear ends of cylinders 76 and 112 and initiating the retraction of tool holders 68 and 110 to withdraw the tools from the work.

As the tools move away from the work, they are subjected to a spray of lubricant, as previously described. As the tool holders move to their retracted positions, pivoted finger 129 engages the operating lever of normally closed switch 128 and momentarily opens the switch. This opens the holding circuit of solenoid 122 and relay 141. As solenoid 122 is de-energized, it evacuates the rear end of cylinder 120 with the result that carriage 109 is moved laterally to its inoperative position and tool holder 110 moved out of axial alignment with work-piece 40. De-energization of relay 141 results in the opening of switches 148, 147, thus opening circuit 145 to the motor 30. Opening of said holding circuit also de-energizes the solenoid brake 33 of said motor, whereupon said brake again applies braking action and rotation of the motor is arrested. The operator then operates switch 137 to drive the motor 51 in the direction which opens the chuck 34 and releases the work. The finished work-piece then is easily removed since the tool holder 110 is not in an obstructing position. This completes a cycle of operation, which may be repeated as desired.

When setting up the machinery preparatory to operation, the switch 136 is left in open or neutral position. Closing of switch 138 will energize relay 141 and solenoid 122 in the manner previously described; if it is not desired to operate motor 30, the circuit 145 thereof may be opened by means of a master switch (not shown). Energized solenoid 122 functions to move carriage 109 laterally so that holder 110 is in axial alignment with the tool holder 68. If a work-piece 40 is mounted in the chuck, the latter may be operated by motor 31 in the manner previously described. Then by turning the switch 136 to the alternative position shown in broken lines in Fig. 14, the relay 142 will be energized to open switch 175 and close switch 176 with the result that solenoids 86 and 114 are energized and effect the projecting of tool holders 68, 110, toward each other. Switch 91 is not in the manually operated circuit and the closing thereof by stud 90 is without effect. The relay 142 may be de-energized to de-energize solenoids 86 and 114 simply by turning switch 136 to neutral position. As the tool holder 110 retracts, it opens switch 128, thereby automatically opening the holding circuit of relay 141 and solenoid 112, thereby causing carriage 109 to be retracted to inoperative position.

From the foregoing it will be apparent that the invention provides a machine tool that is largely automatic in operation. The work-piece is machined with absolute accuracy, its outside diameter being concentric with its axis due to the fact that the work rotates while the tools are stationary. The open end construction facilitates the mounting of the work-piece in the chuck, and its removal therefrom. Furthermore, the arrangement is such that the driving of the work-piece and the reactive thrust of the tools upon the work only serve to urge the chuck-jaws more tightly into engagement with the work. The machine is adapted to perform the several operations of facing, centering, turning, drilling, boring, or spinning upon the work, and the same operation may be performed concurrently upon both ends of the work, or different operations may be performed upon opposite ends. The machine is of rugged, simple construction, thus saving maintenance and repair costs. The machine also saves time and labor and achieves the other objects set out in the foregoing statement of objects.

Modification may be resorted to without departing from the spirit of the invention or the scope thereof as defined by the appended claims.

What is claimed is:

1. In a machine tool, the combination of a centrally positioned chuck for the work, means for driving the chuck to rotate the work therein, a first tool holder at one side of the chuck positionable alternatively laterally stationary in axial alignment with said chuck and at a stationary position laterally spaced therefrom, a second tool holder at the other side of the chuck, an abutment in front of the second tool holder when the first tool holder is laterally spaced from alignment with the chuck, means for withdrawing the abutment from in front of the second tool holder when the first tool holder is in axial alignment with the chuck, and means for simultaneously moving the tool holders towards the work when the tool holders are aligned with the chuck and the work.

2. In a machine tool as set forth in claim 1, and in which the abutment withdrawing means is interposed between the second tool holder and the abutment for moving the abutment from in front of the second tool holder as the second tool holder moves toward the chuck.

3. In a machine tool, a bed, a rotary work-holding chuck mounted on the bed intermediate the ends thereof, the chuck having an opening therethrough concentric with its axis of rotation and the chuck opening having opposite ends and the chuck including jaws radially movable towards and away from the axis of rotation, motor driven power means for moving the chuck jaws, a separate motor for rotating the chuck, a first block on the bed at one side of the chuck and opposite one end opening of the chuck, a first tool holder reciprocably mounted in the first block and having a longitudinal axis aligned with the chuck axis of rotation, a first tool holder reciprocating motor mounted on the first block and connected with the first tool holder for reciprocating the first tool holder, a carriage at the other side of the chuck, means mounting the carriage for reciprocation on the bed laterally with respect to the chuck axis of rotation between two stationary positions, a carriage reciprocating motor operatively interposed between the bed and the carriage for reciprocating the carriage, a second block on the carriage, a second tool holder mounted for reciprocation in the second block in the direction of the chuck axis of rotation, a second tool holder reciprocating motor on the carriage and connected with the second tool holder for reciprocating the second tool holder, and means operative when the carriage is in one stationary position with the second tool holder aligned with the chuck axis of rotation to rotate the chuck and simultaneously move the first and second tool holders towards the chuck by simultaneous operation of the chuck drive motor and the first and second tool holder reciprocating motors, and means maintaining the chuck jaw moving means inoperative during movement of the tool holders towards the chuck.

4. In a machine tool, a bed, a rotary work-holding chuck mounted on the bed intermediate the ends thereof, the chuck having an opening therethrough concentric with its axis of rotation and the chuck opening having opposite ends and the chuck including jaws radially movable towards and away from the axis of rotation, motor driven power means for moving the chuck jaws, separate motor means for rotating the chuck, a carriage at one side of the chuck, means mounting the carriage for reciprocation on the bed laterally with respect to the chuck axis of rotation between two stationary positions, first reciprocating motor means operatively interposed between the bed and the carriage for reciprocating the carriage, a block on the carriage, a tool holder mounted for reciprocation in the carriage block in the direction of the chuck axis of rotation, and second reciprocating motor means on the block and connected with the tool holder for reciprocating the tool holder, and means operative when the carriage is in one stationary position with the tool holder aligned with the chuck axis of rotation to rotate the chuck and simultaneously move the tool holder towards the chuck by simultaneous operation of the chuck drive motor and the second reciprocating motor, and means maintaining the chuck jaw moving means inoperative during movement of the tool holder towards the chuck.

STANFORD OVSHINSKY.

REFERENCES CITED

The following references are of record in the file of this patent:

UNITED STATES PATENTS

| Number | Name | Date |
|---|---|---|
| 927,432 | Seward | July 6, 1909 |
| 945,454 | Hanson | Jan. 4, 1910 |
| 1,587,261 | White | June 1, 1926 |
| 1,775,592 | Harrison | Sept. 9, 1930 |
| 2,086,845 | Bullard | July 13, 1937 |
| 2,086,846 | Bullard | July 13, 1937 |
| 2,135,508 | Hibbard | Nov. 8, 1938 |
| 2,145,875 | Hibbard | Feb. 7, 1939 |
| 2,249,241 | Groene et al. | July 15, 1941 |